(12) United States Patent
Champlin

(10) Patent No.: US 7,079,010 B2
(45) Date of Patent: Jul. 18, 2006

(54) SYSTEM AND METHOD FOR MONITORING PROCESSES OF AN INFORMATION TECHNOLOGY SYSTEM

(76) Inventor: Jerry Champlin, 521 Lost Angel Rd., Boulder, CO (US) 80302

( * ) Notice: Subject to any disclaimer, the term of this patent is extended or adjusted under 35 U.S.C. 154(b) by 1 day.

(21) Appl. No.: 10/820,547

(22) Filed: Apr. 7, 2004

(65) Prior Publication Data

US 2005/0228880 A1    Oct. 13, 2005

(51) Int. Cl.
*G08B 9/00* (2006.01)
(52) U.S. Cl. .................. 340/286.02; 340/506; 340/3.1
(58) Field of Classification Search ........... 340/286.02, 340/506, 3.1
See application file for complete search history.

(56) References Cited

U.S. PATENT DOCUMENTS

| | | | |
|---|---|---|---|
| 4,345,463 A * | 8/1982 | Wilson et al. ................. 374/36 |
| 5,522,026 A * | 5/1996 | Records et al. ............. 715/710 |
| 5,745,692 A * | 4/1998 | Lohmann et al. ............ 709/223 |
| 5,754,111 A * | 5/1998 | Garcia ...................... 340/573.1 |
| 6,112,190 A * | 8/2000 | Fletcher et al. ........... 705/36 R |
| 2004/0153329 A1* | 8/2004 | Casati et al. ................... 705/1 |

* cited by examiner

*Primary Examiner*—Daryl C Pope
(74) *Attorney, Agent, or Firm*—Doyle B. Johnson; Reed Smith LLP

(57) ABSTRACT

A system and method are provided for monitoring processes of an information technology (IT) system. In one example, the system comprises a monitor agent configured to collect performance and availability metrics associated with a host machine, a network, an operating system, a database or an application; a data loader, wherein the monitor agent is further configured to transmit the metrics to the data loader; an escalation server configured to receive and manage alerts generated by the monitor agent, and further configured to group an alert entering the escalation server into a resource group; and an analysis tool including an analysis tool application configured to assist a system manager in visualizing and understanding the performance of the information technology system through the use of a visual graph, a performance report, a real-time operating status or a system health report.

19 Claims, 18 Drawing Sheets

```
<?xml version="1.0"?>
<!DOCTYPE import [
<!ELEMENT import (client+)>
<!ELEMENT client (host+)>
<!ELEMENT host (ma*, log*, re*, li*)>
<!ELEMENT madata (m, s)>
<!ELEMENT m (#CDATA)>
<!ELEMENT s (#CDATA)>
<!ELEMENT log (m, s)>
<!ELEMENT re (m)>
<!ELEMENT li (m)>
<!ATTLIST client name CDATA #REQUIRED>
<!ATTLIST host name CDATA #REQUIRED>
<!ATTLIST host time CDATA #REQUIRED>
<!ATTLIST ma dk CDATA #REQUIRED>
<!ATTLIST ma time CDATA #IMPLIED>
<!ATTLIST log dk CDATA #REQUIRED>
<!ATTLIST log time CDATA #IMPLIED>
<!ATTLIST re type CDATA #REQUIRED>
<!ATTLIST re time CDATA #IMPLIED>
<!ATTLIST li time CDATA #IMPLIED>
<!ATTLIST li interval CDATA #REQUIRED>
]>

<import>
        <client name=company1>
                <host name="host.company1.com" time="1000000000">
                        <ma dk="OS|HP-UX|CPU|pct_busy" time="1000000011">
                                <m>98</m>
                                <s>2</s>
                        </ma>
                        <log dk="OS|HP-UX|Log|Syslog">
                                <m> ... </m>
                                <s>2</s>
                        </log>
                        <re type="Disk Configuration">
                                <m>Text of report</m>
                        </re>
                        <li dk="App|Lawson|614|Transactions|gl_trans|trans_day" time="1000000000" interval=86400>
                                <m>1000</m>
                        </li>
                </host>
        </client>
</import>
```

FIG. 3

5.1 Total Latch Wait Time

The total latch wait time is the amount of time (in milliseconds) that all processes have waited for a latch, and is cumulative from the startup of SQL Server. The graph below can provide two insights into the performance of SQL Server:

- An indication that SQL Server was stopped and restarted (the counter was reset back to 0)

- Can illustrate periods of time that latch contention is highest (If the graph jumps at consistent periods of time, such as when nightly batch jobs execute)

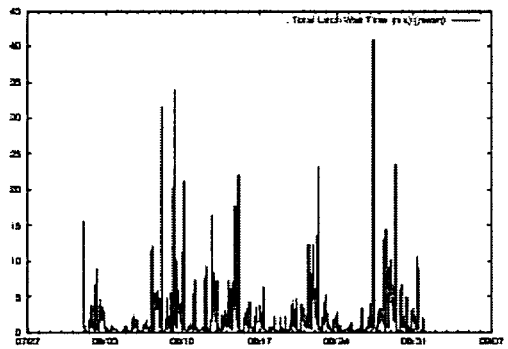

Figure 10: Total Latch Wait Time in ms

Analysis Results

The maximum Total Latch Wait Time is 714.30 ms and is above 30 ms. It is possible this problem is due to a disk bottleneck, where the length of the latch held is unusually long while the disk heads must seek to the proper location before reading the data. Another possibility is that the buffer cache is sized too small so that many queries must read their data from disk (instead of the buffer cache). It is a good idea to examine the buffer cache hit ratios, the disk queue lengths (from the OS report) and the number of latches/sec that are being requested.

FIG. 9

SYSTEM AND METHOD FOR MONITORING PROCESSES OF AN INFORMATION TECHNOLOGY SYSTEM

BACKGROUND OF THE INVENTION

1. Field of the Invention

The present invention generally relates to monitoring computer systems and, more particularly, to comprehensive and user-friendly monitoring tools for system managers of information technology (IT) systems.

2. Discussion of Background

Information technology (IT) systems need monitoring in order for the IT systems to work properly. The behavior of IT systems also needs analysis in order to predict any future problems or failures. Monitor systems typically display status information of an IT system on a web page for example. Unfortunately, monitor systems have lacked a comprehensive user-friendly framework that allows system managers to easily detect and predict current and potential system problems.

SUMMARY OF THE INVENTION

It has been recognized that what is needed is a monitor system that allows system managers to easily detect and predict current and potential system problems. Broadly speaking, the present invention fills these needs by providing a comprehensive system and method for monitoring processes of an information technology (IT) system. It should be appreciated that the present invention can be implemented in numerous ways, including as a process, an apparatus, a system, a device or a method. Several inventive embodiments of the present invention are described below.

In one embodiment, a system for monitoring processes of an information technology (IT) system is provided. The system comprises a monitor agent configured to collect performance and availability metrics associated with at least one of a host machine, a network, an operating system, a database, and an application; a data loader, wherein the monitor agent is further configured to transmit the metrics to the data loader; an escalation server configured to receive and manage alerts generated by the monitor agent, and further configured to group an alert entering the escalation server into a resource group; and an analysis tool including an analysis tool application configured to assist a system manager in visualizing and understanding the performance of the information technology system through the use of at least one of a visual graph, a performance report, a real-time operating status, and a system health report. A document center is provided that captures, in a central repository, performance reports, system health reports and any other documentation required by the user. Key performance indicators (KPI) is provided to rollup data from multiple hosts to provide a summary analysis of performance across all of those hosts.

In another embodiment, a method of monitoring processes of an information technology (IT) system is provided. The method comprises collecting via a monitor agent performance and availability metrics associated with at least one of a host machine, a network, an operating system, a database, and an application; transmitting the metrics from the monitor agent to a data loader; transmitting alerts from the monitor agent to an escalation server, wherein the escalation server is configured to group an alert entering the escalation server into a resource group; and analyzing the metrics and alerts using an analysis tool that includes an analysis tool application configured to assist a system manager in visualizing and understanding the performance of the information technology system through the use of at least one of a visual graph, a performance report, a real-time operating status, and a system health report.

The invention encompasses other embodiments of a system, a method, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

FIG. 3 is an example of a specification for an extensible markup language (XML) document type definition (DTD), in accordance with an embodiment of the present invention;

FIG. 9 is an example page from a sample report generated from the process of FIG. 8, in accordance with an embodiment of the present invention;

DESCRIPTION OF THE PREFERRED EMBODIMENTS

An invention for a system and method for monitoring processes of an information technology (IT) system is disclosed. Numerous specific details are set forth in order to provide a thorough understanding of the present invention. It will be understood, however, to one skilled in the art, that the present invention may be practiced without some or without all of these specific details.

General Overview

The computer system of the present invention is a comprehensive software framework, which provides monitoring, analysis, and management capabilities for client servers and applications through a multi-tier architecture. The various components of this system are designed to be secure, highly available, fault-tolerant, extensible and scaleable.

Figure 1:
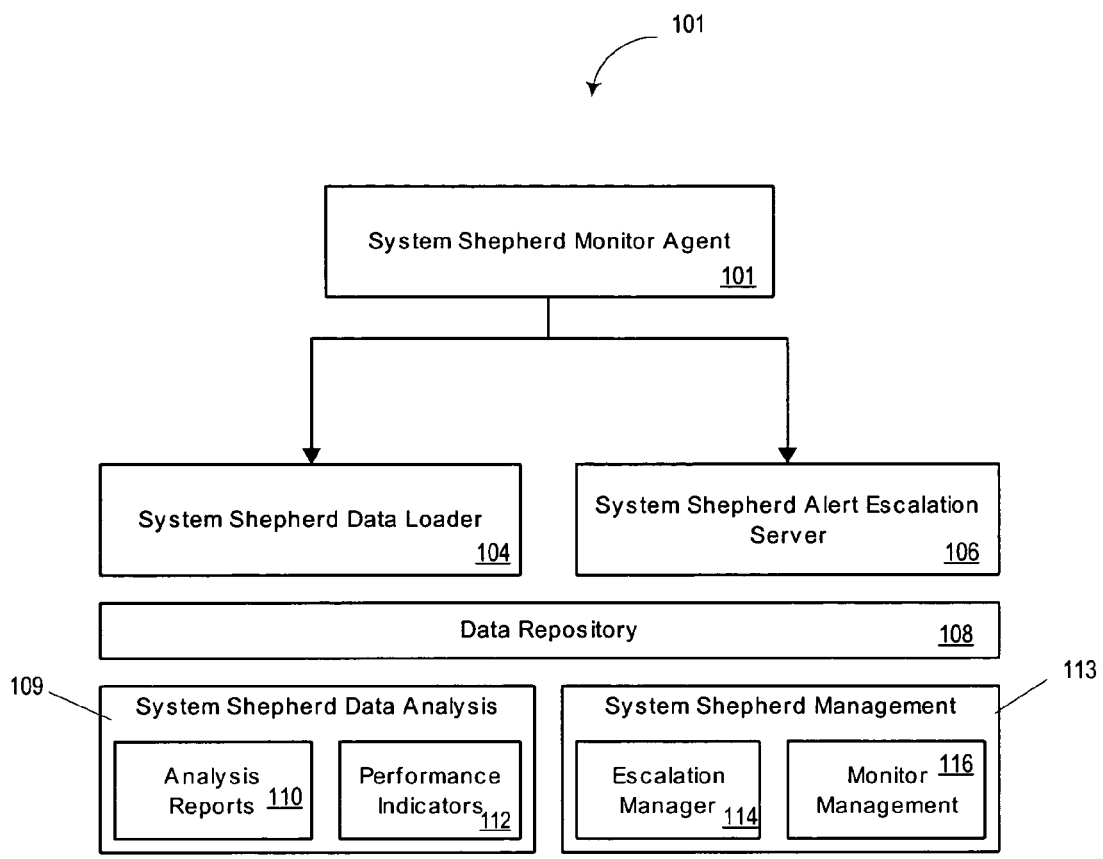
FIG. 1 is a schematic diagram of the component architecture of the system, in accordance with an embodiment of the present invention.

FIG. 1 is a schematic diagram of the component architecture 101 of the system, in accordance with an embodiment of the present invention. The individual components of the system may be aggregated by the service role they play in the overall framework.

The monitoring and measurement capabilities start with the monitor agent 102, a remote agent installed on the host machine. The agent continuously measures the availability and performance of the host operating system, as well as its services and applications. These metrics are in turn forwarded to the data loader 104, where they are then processed and made available for the framework analysis applications. The monitor agent 102 may be configured to run on any industry accepted or widely used operating system. Accordingly, the system is platform agnostic.

In addition, the monitor may be configured with thresholds for certain metrics, which, when exceeded, trigger alerts that are sent to the alert escalation server 106. The alert escalation server 106 utilizes a highly configurable set of rules that determine the notification frequency, escalation path and recipients of each received alert.

The software framework also provides a robust set of tools to analyze as well as manage the large amount of raw data generated by the monitor. The data analysis tools 109 serve to aggregate and condense the data for use in a variety of analysis formats. These tools include automatically generated performance analysis reports 110, key performance indicators (KPI) 112, on-demand trend graphing capability, and real-time status reports on the health of the client system.

Another set of tools serve to manage the activity of the monitoring system, which are grouped as the management tools 113. Generally speaking, these tools enable the administration of the configuration of the alert escalation system as well as interacting with the operation of the alert system itself, allowing users to search, close, suspend and acknowledge escalations generated by the monitor agents.

The Monitor Agent

The primary function of the monitor agent 102 is to collect performance and availability metrics on the host machine and report them to the data loader 104. In the event that the monitor agent 102 encounters a measurement or a trend in measurements that exceeds a configured performance threshold or performance trend rule, the monitor agent 102 is also able to generate an alert, which is sent to and handled by the alert escalation server 106.

The monitor agent 102 is run as a daemon process and loops through a list of metrics to collect data, as dictated by a time interval specified in the monitor agent's configuration file. The monitor agent 102 itself is designed to be a generic monitoring tool that provides a set of facilities or application program interface (API) for reporting metrics and handling alerts. However, the metrics themselves are collected by a set of specialized monitor classes, which are loaded, initialized, and executed by the monitor agent 102 during runtime. In this manner, the agent may be extended to collect additional metrics with little impact on the existing code. The monitor agent 102 also monitors text based log files and generates alerts based on pattern matches or pattern match frequencies which exceed a configured performance threshold.

At specified intervals, the monitor agent 102 executes the monitor method of each configured monitoring class, aggregating the complete set of measurements to report back to the data loader server 104. This set of data is serialized into an extensible markup language (XML) stream for transport via either hypertext transfer protocol (HTTP or HTTPS) or simple mail transfer protocol (SMTP). SMTP is usually configured as a backup protocol to HTTP or HTTPS for fault-tolerance. In the event that neither protocol succeeds, messages are spooled by the agent until a connection can be re-established. At that time the backlog is gradually processed until clear.

As the agent processes each set of metrics, the metric values are compared to the configured alert thresholds. Two distinct thresholds may be set, one for a "warning" condition and another for a "critical" condition. Should either of these thresholds be exceeded, the agent will construct an alert message, serialized in an XML stream, and send it to the Alert Escalation Server via HTTP or HTTPS. Should the alert fail to be received for whatever reason, the alert will then be transmitted through SMTP as part of a failsafe notification mechanism.

Figure 2:
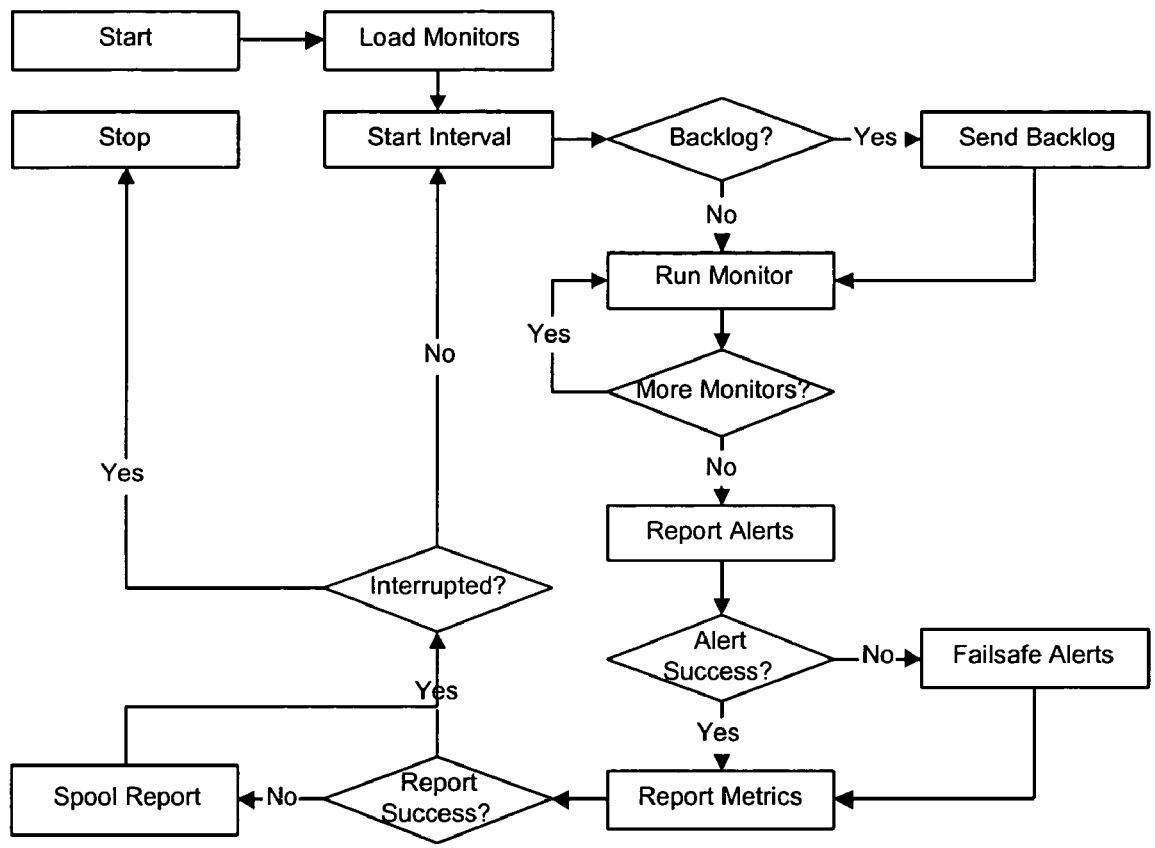
FIG. 2 is a flowchart of the activities of the monitor agent, in accordance with an embodiment of the present invention.

FIG. 2 is a flowchart of the activities of the monitor agent 102 described above, in accordance with an embodiment of the present invention.

The data transport relationship established between the monitor agent 102 and the data loader 104 is based on the design pattern idea of Proxy/Adapter pairs, where a data loader API proxy exists for each transport protocol. The protocol adapter on the data loader 104 is responsible for deserializing the XML message sent by the proxy and executing the requested operation. This enables a flexible and extensible transport mechanism for communication.

FIG. 3 is an example of a specification for an extensible markup language (XML) document type definition (DTD), in accordance with an embodiment of the present invention.

The Data Loader

The data loader 104 is responsible for receiving metric raw data reports transmitted by the remote monitor agents by way of either HTTP or HTTPS or SMTP. For HTTP messages, the XML stream is received and deserialized by a perl module written for the Apache mod_perl environment. As each metric is received, it is stored in the database and related with the same metrics collected earlier from that same host. An in-memory caching system is used to lookup these metric-host groupings while minimizing database traffic.

Metrics are described within the data repository 108 according to a hierarchical metric taxonomy, which conceptually relates classes of metrics with one another. For example, all data related to the host operating system are differentiated from data related to hosted applications. Furthermore, each of these branches is further refined and classified into sections—Disk activity and CPU activity within the operating system branch for example. These metric paths are in turn associated with individual hosts for which corresponding data is collected. In this way, collected data can be cataloged to a particular path and host and retrieved for subsequent analysis.

The individual metric data paths that describe the data gathered for a host are also tied to the notion of a generic data path, which are not tied to any host but rather describe a general family of data paths. An example of such a data path might be all measurements related to the Apache web server or perhaps all metrics related to disk swapping activity.

Figure 4:
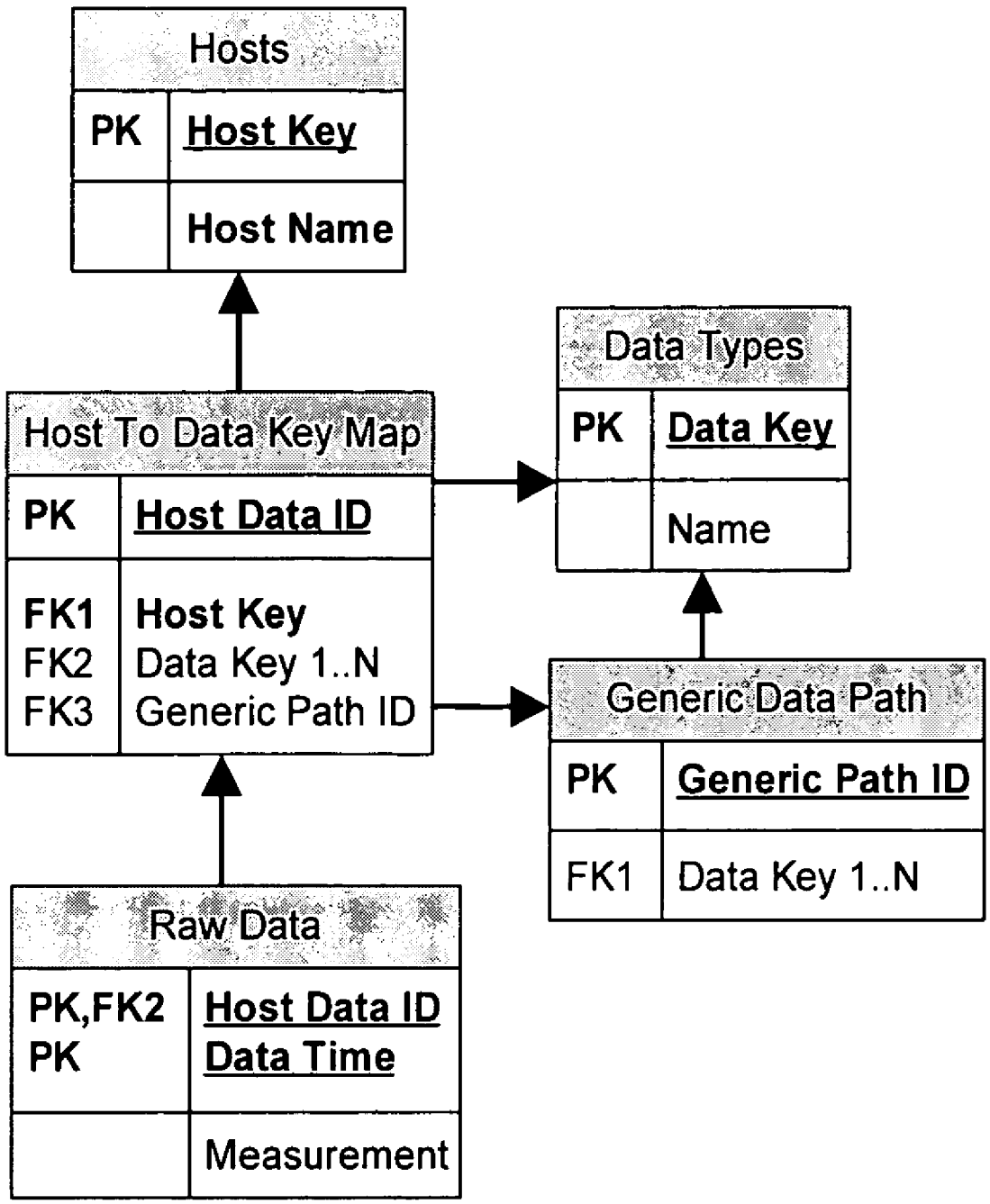
FIG. 4 is a simplified core data model describing the key elements of the data loader, in accordance with an embodiment of the present invention.

FIG. 4 is a simplified core data model describing the key elements of the data loader 104, in accordance with an embodiment of the present invention.

This process is how the raw data for monitored hosts gets stored in the data repository 108. In addition, status information from the latest metric received is stored as a means to display real-time system health information through the data analysis tools 109.

As mentioned above, the HTTP Data Loader has a parallel component in the form of a stand-alone daemon which continuously scans a mail spool for incoming messages via SMTP. The operation of this daemon is, in all other respects, the same as the HTTP loader. The two symmetric processes correspond to the protocol adapters for each proxy/adapter pair in the system.

Figure 5:
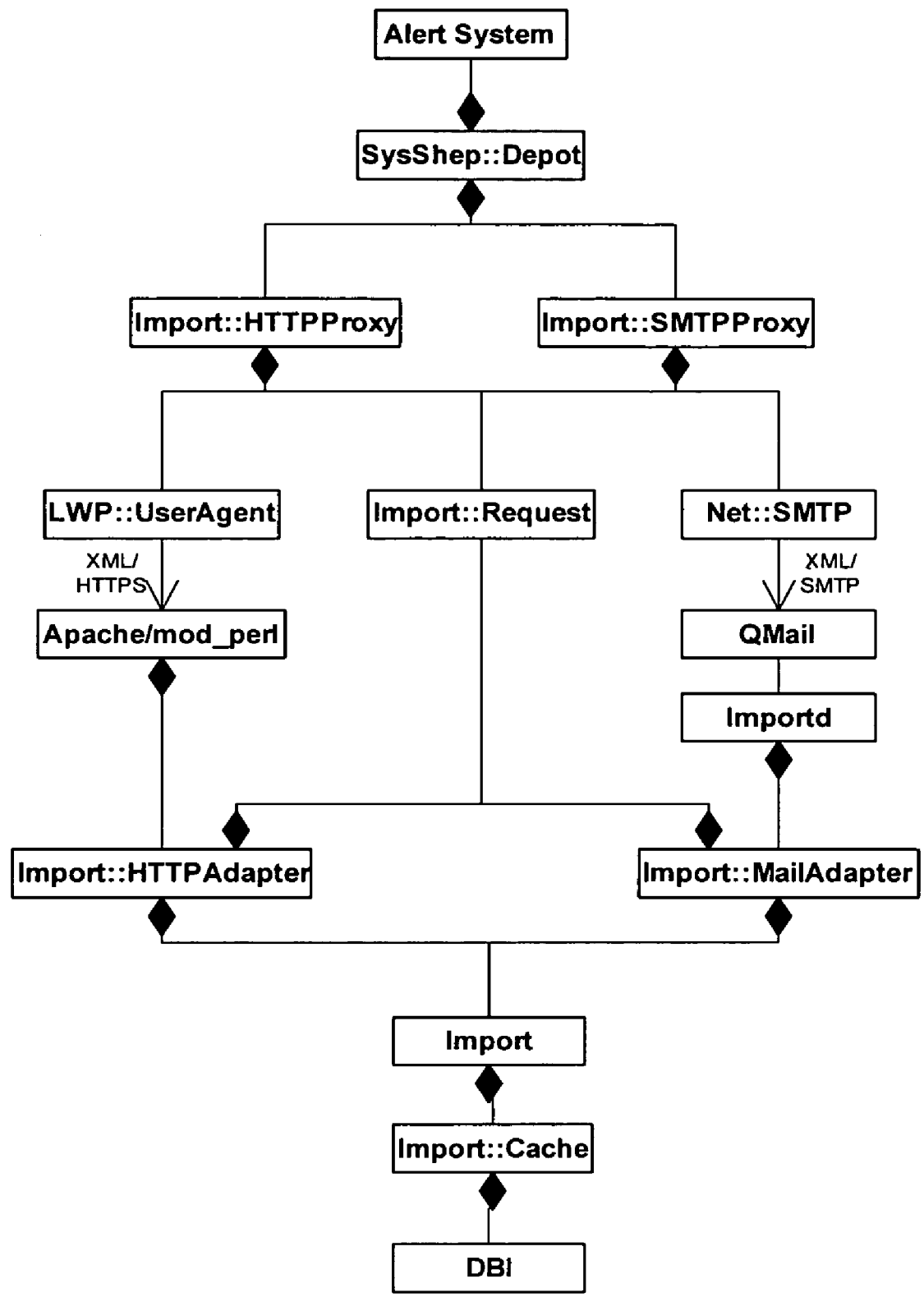
FIG. 5 is a simplified class diagram of the composition entities of the data loader, in accordance with an embodiment of the present invention.

FIG. 5 is a simplified class diagram of the composition entities of the data loader 104, in accordance with an embodiment of the present invention. FIG. 5 shows the relationship of the two symmetric processes of the HTTP proxy and the SMTP proxy.

The HTTP Loader is also extremely fault-tolerant. In the event the process is interrupted or an exception is encountered during the processing of a message, the message is redirected to the SMTP spool for deferred processing. In the event of a performance degradation, the HTTP loader will also run in an "economy" mode, which defers message processing to the SMTP spool for resource conservation until normal operating conditions resume.

Because SMTP processing is by nature asynchronous, the existence of this fallback processing mechanism ensures a minimum level of availability given potentially fluctuating system resources.

Alert Escalation Server

The alert escalation server 106 is the framework system responsible for receiving and managing the alerts generated by the monitor agents 102. Alerts entering the framework are grouped together by the type of resource generating the alert. These groupings are called resource groups. Examples of resource groups may include database related alerts, application related alerts or operating system alerts. These resource groupings, when assigned to a host and a list of alert recipients, allow the creation of escalation paths, which represent the lifecycle of an alert incident for a monitored host.

The escalation paths are defined by a sequence of path steps, which progress the alert through its lifecycle. At each sequential step in the path, if the alert is not resolved, the escalation will progress to the next step and alert the people responsible for alerts at that step of the cycle. In this manner, alerts can evolve in scope, reach and urgency depending on their duration and origin. Subsequently received alerts, if originating from the same host for the same resource group are grouped in with the open escalation since they are related to the first alert.

Figure 6:
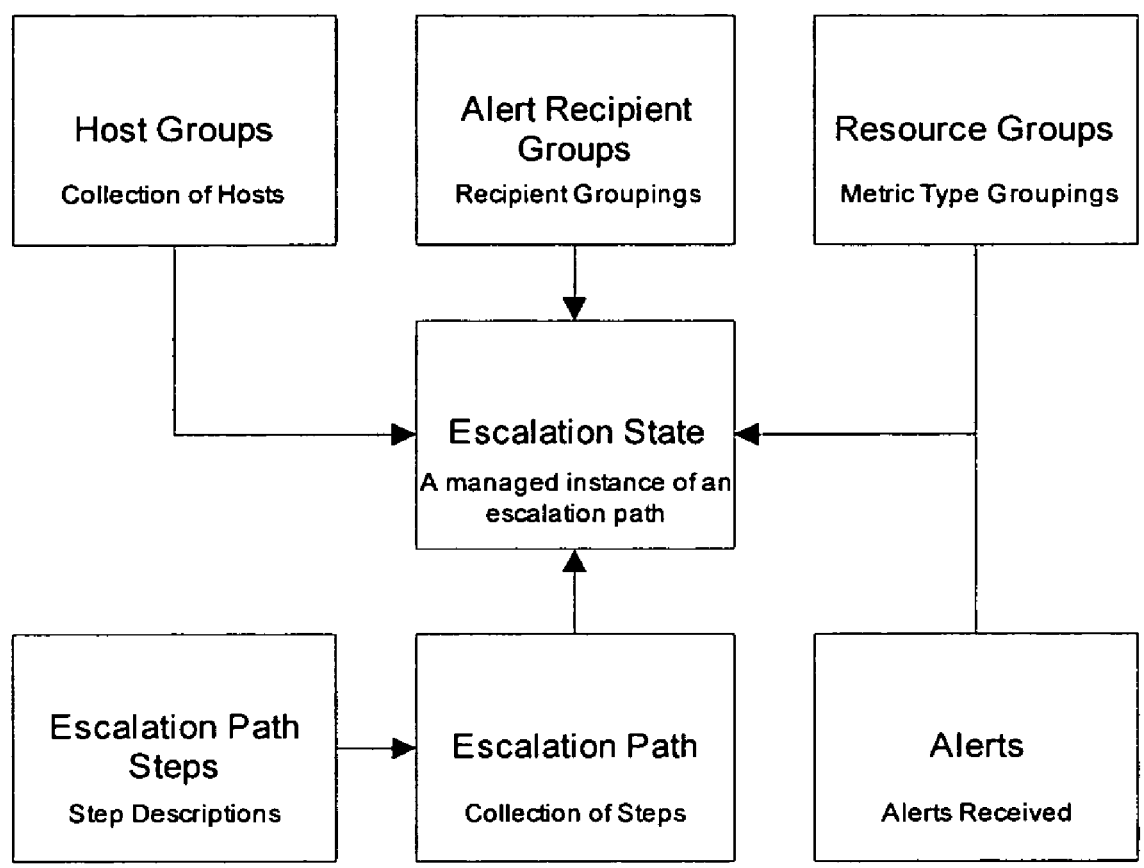
FIG. 6 is a schematic diagram showing the relationships between alert escalation entities, in accordance with an embodiment of the present invention.

FIG. 6 is a schematic diagram showing the relationships between alert escalation entities, in accordance with an embodiment of the present invention.

The alert escalation server 106 is governed by two principle processes, the alert adapter and the alert sweeper. The alert adapter is a mod_perl Apache process, primarily responsible for receiving the serialized XML stream from monitor agents, which signal a problem requiring resolution. Upon receiving an alert, the alert adapter will first check to see if the alert is part of an already open escalation. Should an escalation already be open for the alert's resource group and host, the alert will be bundled with the open escalation and alert notifications will continue to be generated as prescribed by the escalation path steps.

However, if the alert received does not have an already open escalation, a new escalation will be opened on behalf of the alert, which will start a lifecycle of notifications for this and all subsequent related alerts. In this initial treatment of the alert, an immediate notification is usually sent out to the appropriate parties to indicate that a new alert has been received and that an escalation process has been started. In the event that the adapter encounters an exception during any of part of this process, the adapter sends an error code back to the sending monitor (in the form of an HTTP response), which describes the nature of the error encountered. The monitor will then failsafe the alert along with the reason that the initial alert notification attempt failed.

The alert sweeper is responsible for managing the escalations that have been opened by the alert adapter. Managing escalations entails sending out alert notifications according to the defined intervals at each step as well as advancing escalations to subsequent steps when needed. If an escalation has been manually suspended for any length of time, the sweeper will also see if the suspension duration has expired and the escalation path should be resumed. The alert sweeper will also automatically close escalations in the event that the resource that generated the alert starts sending in normal, signaling that the problem has been resolved. Management of the escalation will also check to see if the host or a group of hosts in question is being maintained (a configuration option), which has the effect of suppressing alert notifications as well as escalations.

Figure 7:
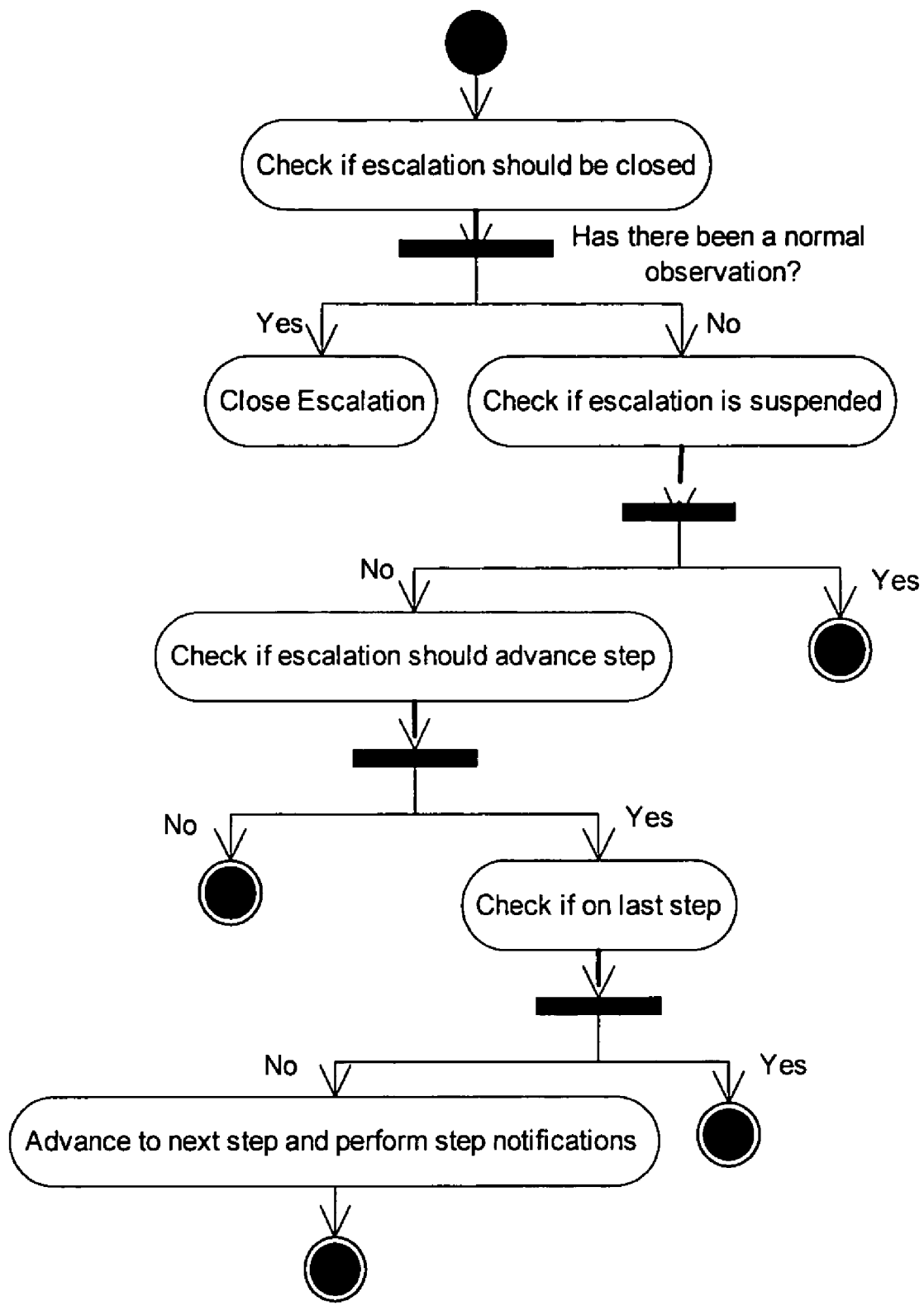
FIG. 7 is a flowchart of the escalation management process, in accordance with an embodiment of the present invention.

FIG. 7 is a flowchart of the escalation management process, in accordance with an embodiment of the present invention.

The Analysis Tools

The analysis tools are a collection of processes, which collaborate to assist managers in visualizing and understanding the performance of their systems through the use of visual graphs, performance reports, real-time operating status and system health. The function of key performance indicators (KPI) 112 is to rollup data from multiple hosts to provide a summary analysis of performance across all of those hosts. The technologies required to generate these products include the data aggregation process, the custom graphing engine, the reporting engine and the web portal.

The analysis process starts with the conversion of raw measurement data into aggregated data for various time intervals. Aggregated data records various aspects of the raw data sets for a given duration, including its minimum, maximum, mean, median, standard deviation, skew, kurtosis and percentile data. This condensed raw data facilitates the manipulation and presentation of measurement data by the tools mentioned above. This process is driven by the rollup daemon, a scaleable, distributable sub-system, which processes incoming raw data and summarizes it according to time intervals specified by the metric's assigned generic data category. Once this data has been condensed, it is then available for use by the graphing engine and reporting engine for analysis.

The graphing engine is a collection of perl modules, which provide a programmatic interface to easily map and manipulate metric data, grouped by data category, into data files and graph definitions. Note the present invention is not limited to the perl scripting language. The programmatic interface may provided by another language, such as C, C++, Java, or any other suitable language.

The files can then be used by a custom designed java-based graphing engine to generate sophisticated visualizations of the metric data. By creating definitions for these graphs, managers can see performance trends of their systems as well as establish visual comparative relationships by grouping related metric data and systems.

The graphing system is used by both the reporting engine as well as the portal for presenting analysis information to system managers.

The reporting engine processes re-usable text templates, which describe the compositional elements of a performance analysis report. These templates provide a structure for describing not only creating descriptive text for the report, but also for generating various types of graphs with the graphing engine as well as a structured language for heuristically generating data analysis depending on the data's characteristics. This allows the reporting engine to easily generate very detailed and descriptive reports on the performance of a host's operating system or application as well as provide analysis on the data presented to make recommendations for improving performance or availability.

Figure 8:
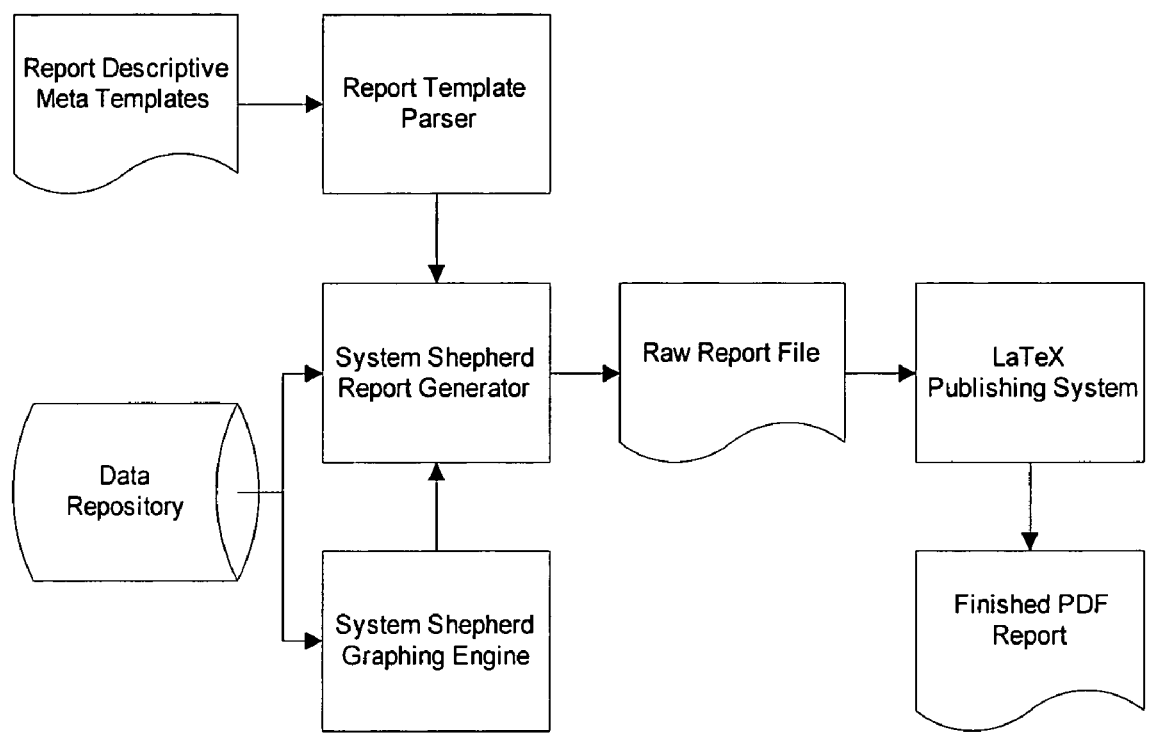
FIG. 8 is a flowchart of the report generation process, in accordance with an embodiment of the present invention.

FIG. 8 is a flowchart of the report generation process, in accordance with an embodiment of the present invention. The system that takes these meta-report templates and constructs them into portable document formatted (PDF) files relies on a number of interrelated technologies. The data aggregation and graphing capability is delegated to the rollup daemon and graphing engine described above. Furthermore, the report templates are parsed using a template processing engine called the Template Toolkit (a perl open-source module). The reports are then assembled into text files formatted for TeX processing, an open source document processing system, which incorporates all the textual and graphical elements into a nicely formatted PDF file.

FIG. 9 is an example page from a sample report generated from the process of FIG. 8, in accordance with an embodiment of the present invention.

The last system component of the suite of analysis tools is the portal, which contains abilities to present real-time and historical system performance information on-demand through a graphical web-based user interface.

The system presents the portal user with a high-level summary of the status or health of the various servers that are currently being monitored. A color-coded system of red, yellow and green quickly alerts her to the overall status and which group of hosts has any outstanding issues. In order to quickly locate the source of the problem, or just to view the general condition of server metrics that are performing within acceptable thresholds, the user may utilize a "tree-menu" or collapsible menu, which allows a quick navigation through the hierarchy of metric data being monitored for that host.

Figure 10:
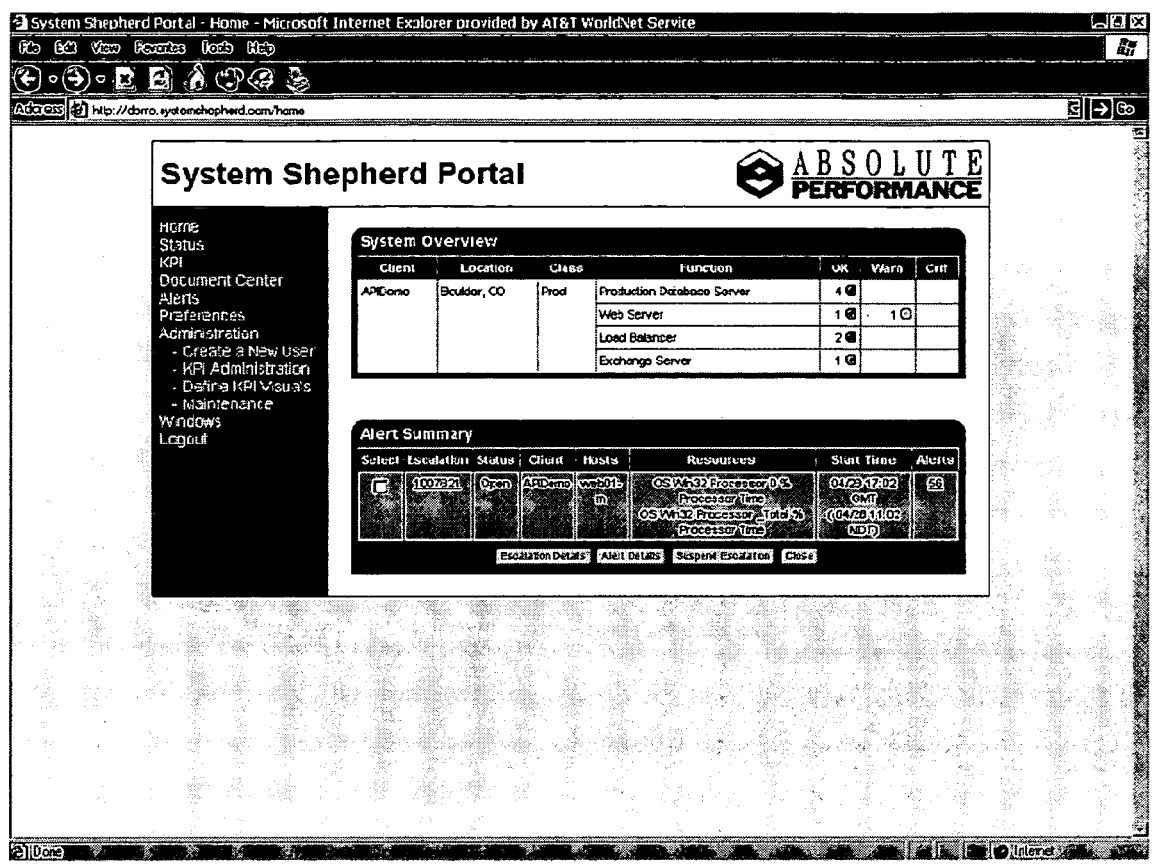
FIG. 10 is an example of a portal system summary screen, in accordance with an embodiment of the present invention.
Figure 11:
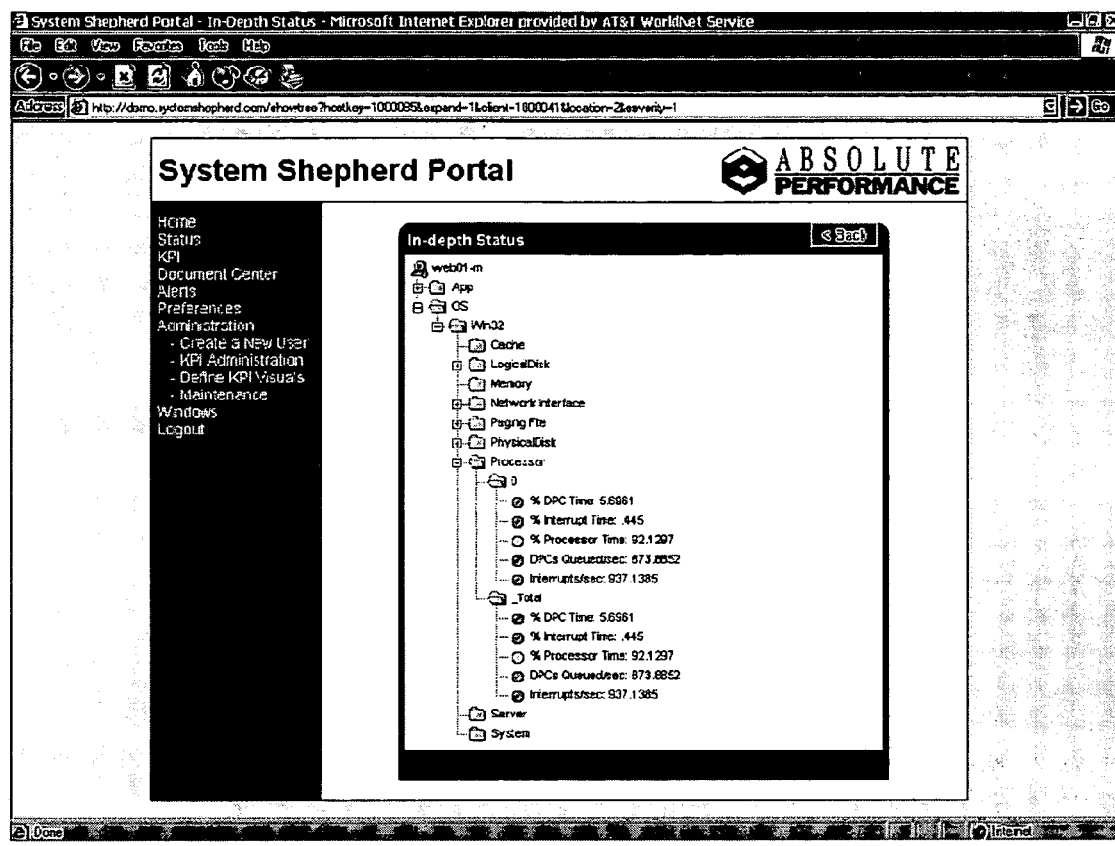
FIG. 11 is an example of a hierarchy view of the portal system, in accordance with an embodiment of the present invention.

FIG. 10 and FIG. 11 are examples of these views that allow a quick navigation through the hierarchy of metric data being monitored for that host. FIG. 10 is an example of a portal system summary screen, in accordance with an embodiment of the present invention. FIG. 11 is an example of a hierarchy view of the portal system, in accordance with an embodiment of the present invention.

Next to each leaf of the hierarchy is the most current measurement value for that particular metric. In addition, by selecting that metric, the user is then able to graph the historical data for that metric over any specified length of time, which uses the system graphing engine API. These graphs can further be manipulated to contain multiple metrics (for comparative analysis) and/or multiple hosts.

An additional feature of the system is a document center that captures, in a central repository, performance reports, system health reports and any other documentation required by the user.

Figure 12:
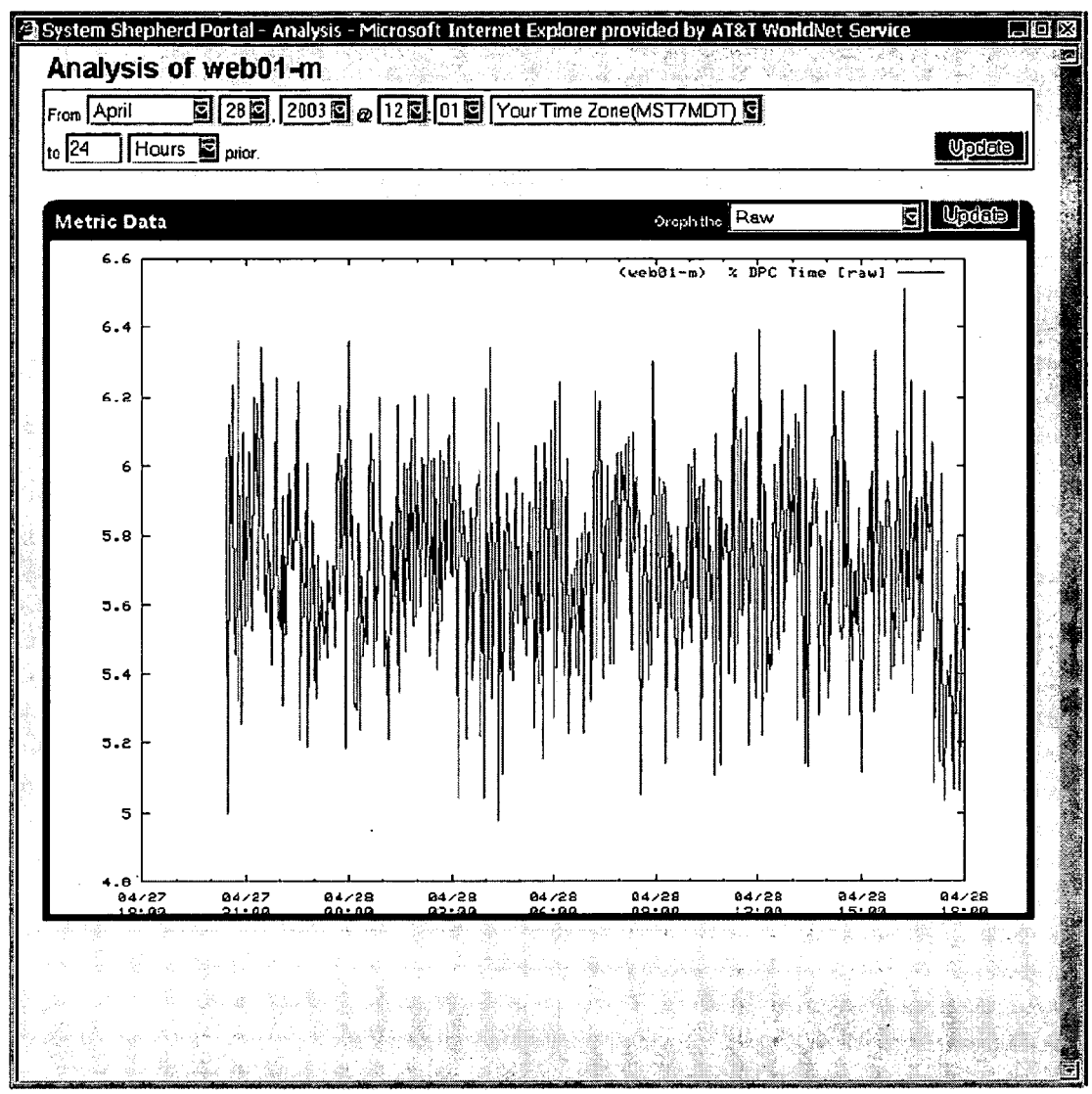
FIG. 12 is an example of a graph that contains information multiple metrics and multiple hosts, in accordance with an embodiment of the present invention.

FIG. 12 is an example of a graph that contains information multiple metrics and multiple hosts, in accordance with an embodiment of the present invention. Technology behind this portal user interface includes the Apache™ web server, the mod_perl extension, the Apache™ PageKit™ web publishing system and custom application business and presentation logic within these frameworks.

Key Performance Indicators

The system framework supplies many ways to view and analyze the raw data collected by the monitor agent. However, up until this point, the analysis tools focused solely on specific metrics for specific hosts. The ability of the system framework to report on data aggregated by host groups has not yet been discussed. This logical grouping of metrics across hosts may be referred to as "key performance indicators" (KPI) 112. KPI 112 is very useful for performance analysis as it allows one to quickly measure the performance of overall system application function, availability and health.

For example, a key performance indicator that a user may be interested in tracking is the availability of a web-based application. Using KPI 112, the user may quickly see the overall health of the application as KPI 112 tracks the system health of all the critical components involved, from the database server, the application servers, the web servers and load balancers. Should any of these components become unavailable, KPI 112 is capable of inferring that the entire application has been compromised.

In addition, KPI 112 is useful for capacity analysis and planning. Because KPI 112 is capable of aggregating metrics across groups of hosts, planners can quickly see the amount of disk, CPU and memory utilization and the trends associated with each for their entire hosting environment.

The logical groupings KPI 112 uses to aggregate a set of metrics may be referred to as a "service group". Service groups may contain other service groups but are primarily composed of one or more host data metrics. Should any of the member metrics show a warning or critical status, the overall status of the service group may be affected, which changes the state of the service group's availability. In addition, service groups serve as the basic unit for aggregating core metrics, including CPU, disk, and memory usage. These core metrics may be referred to as "KPI metrics". These KPI metrics are calculated for their related service groups and stored over time according to a specified frequency.

Figure 16:
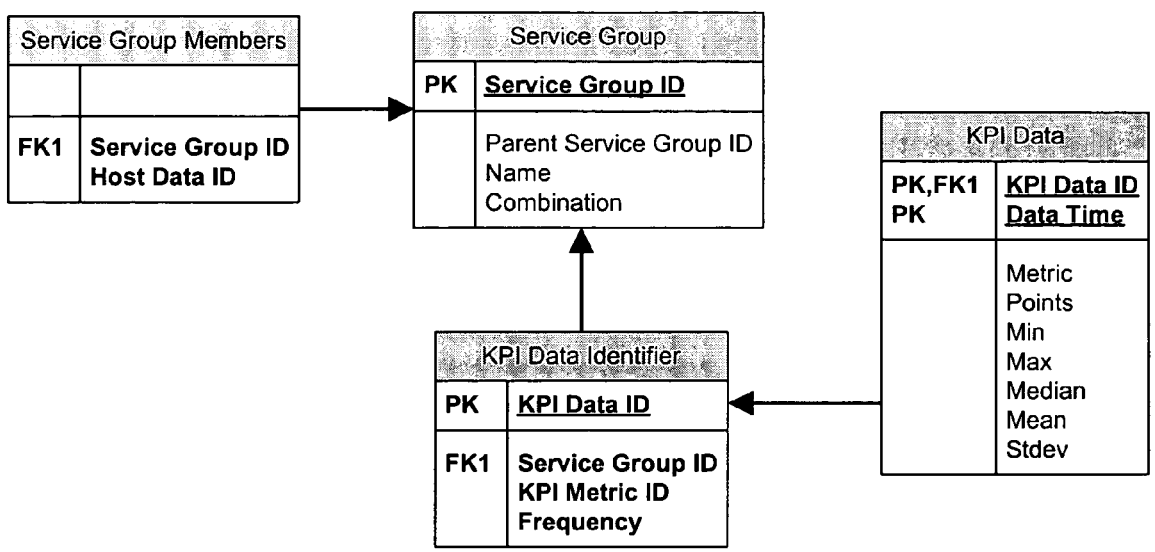
FIG. 16 is a simplified Entity Relationship Diagram (ERD) showing the general relationship of key performance indicator metrics, in accordance with an embodiment of the present invention.

FIG. 16 is a simplified ERD showing the general relationship of KPI metrics, in accordance with an embodiment of the present invention.

The service group hierarchy and associated data is populated using a web-based interface, accessible from the system administrative portal. Using this interface, administrators can create service groups, specify which KPI metrics should be tracked for each group and also create an availability definition composed of host metrics, which will be used in calculating the service group's overall availability.

Figure 17:
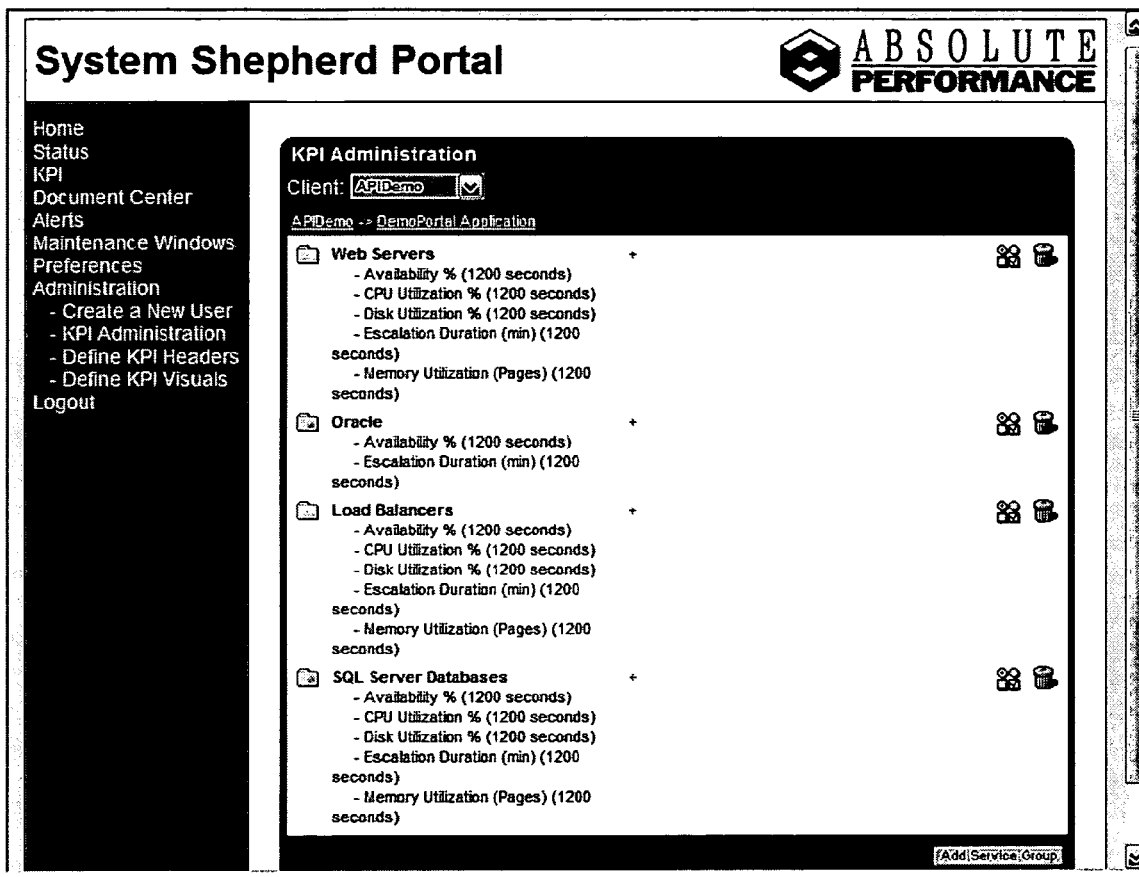
FIG. 17 shows examples of a web-based interface used for populating a service group hierarchy and associated data, in accordance with an embodiment of the present invention.

FIG. 17 shows examples of a web-based interface used for populating a service group hierarchy and associated data, in accordance with an embodiment of the present invention. Once the service groups and their associated KPI metrics have been created using this interface, the KPI aggregation daemon gathers and computes the results for each service group based on the real-time host metrics sent in by the agent and stored by the data loader. The KPI aggregation daemon is responsible for calculating KPI metrics for every defined service group according to the frequency specified by the KPI data table. As these values are calculated for each service group per interval, they are stored in the KPI data table where they can be used for generating KPI analysis graphs in the portal, for example, service group availability for the past 30 days, aggregate CPU utilization for the past 30 days, etc. These analysis graphs may be defined in the KPI administrative area of the system portal, where, once defined by an administrator, they may be included for display by portal users.

Figure 18:
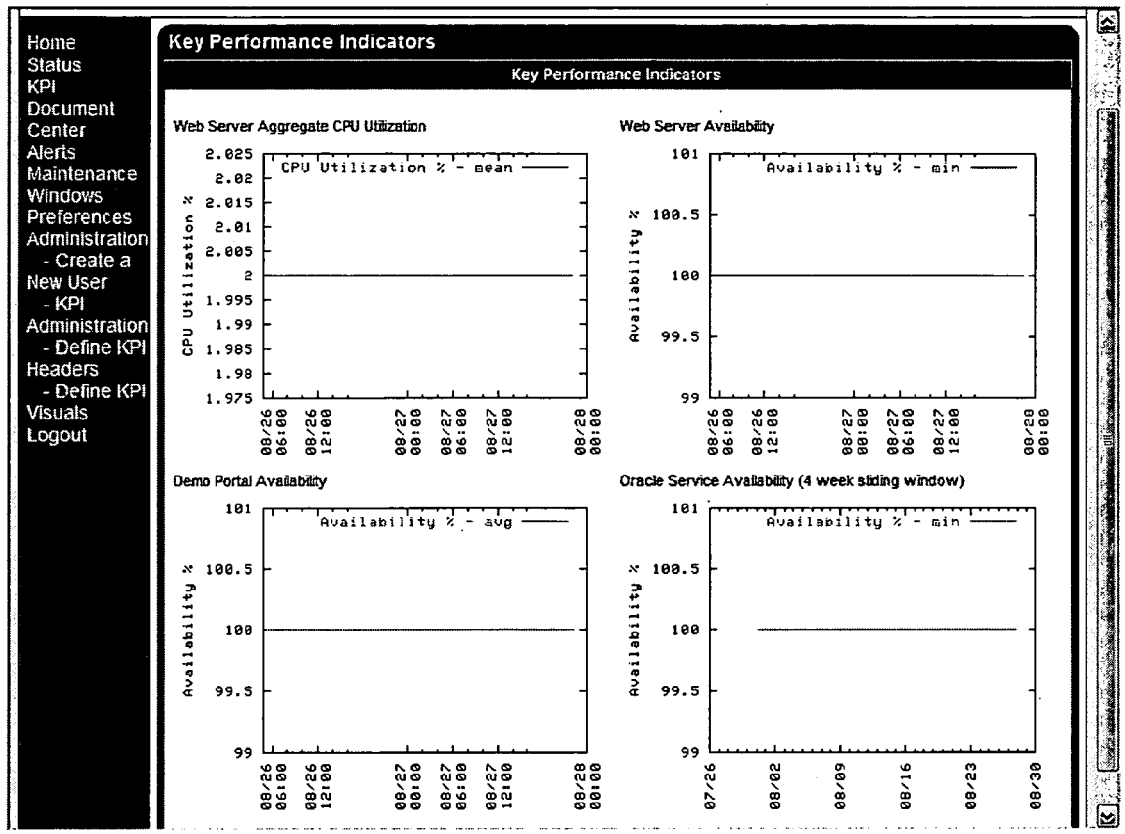
FIG. 18 is an example of the display page for key performance indicators, in accordance with an embodiment of the present invention.

FIG. 18 is an example of the display page for key performance indicators, in accordance with an embodiment of the present invention.

Management Tools

Figure 13:
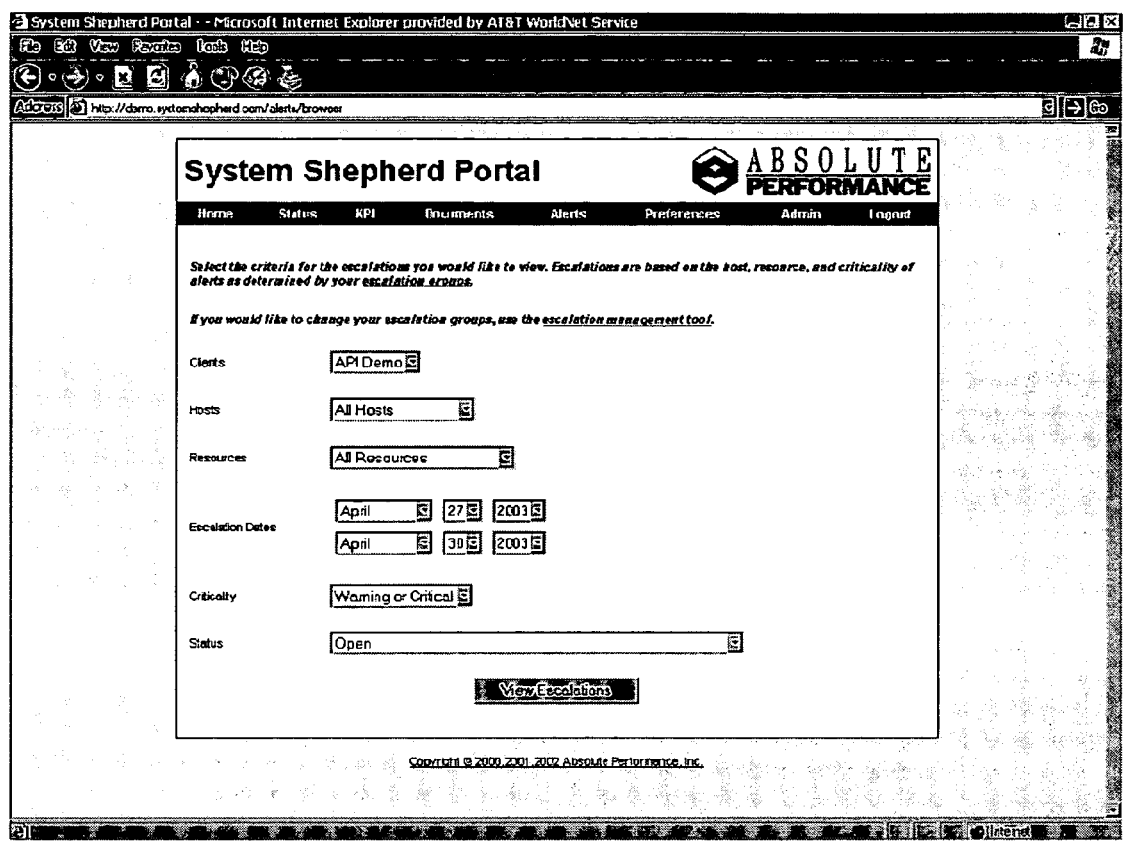
FIG. 13 is an example of an escalation management interface, in accordance with an embodiment of the present invention.

FIG. 13 is an example of an escalation management interface, in accordance with an embodiment of the present invention.

Figure 14:
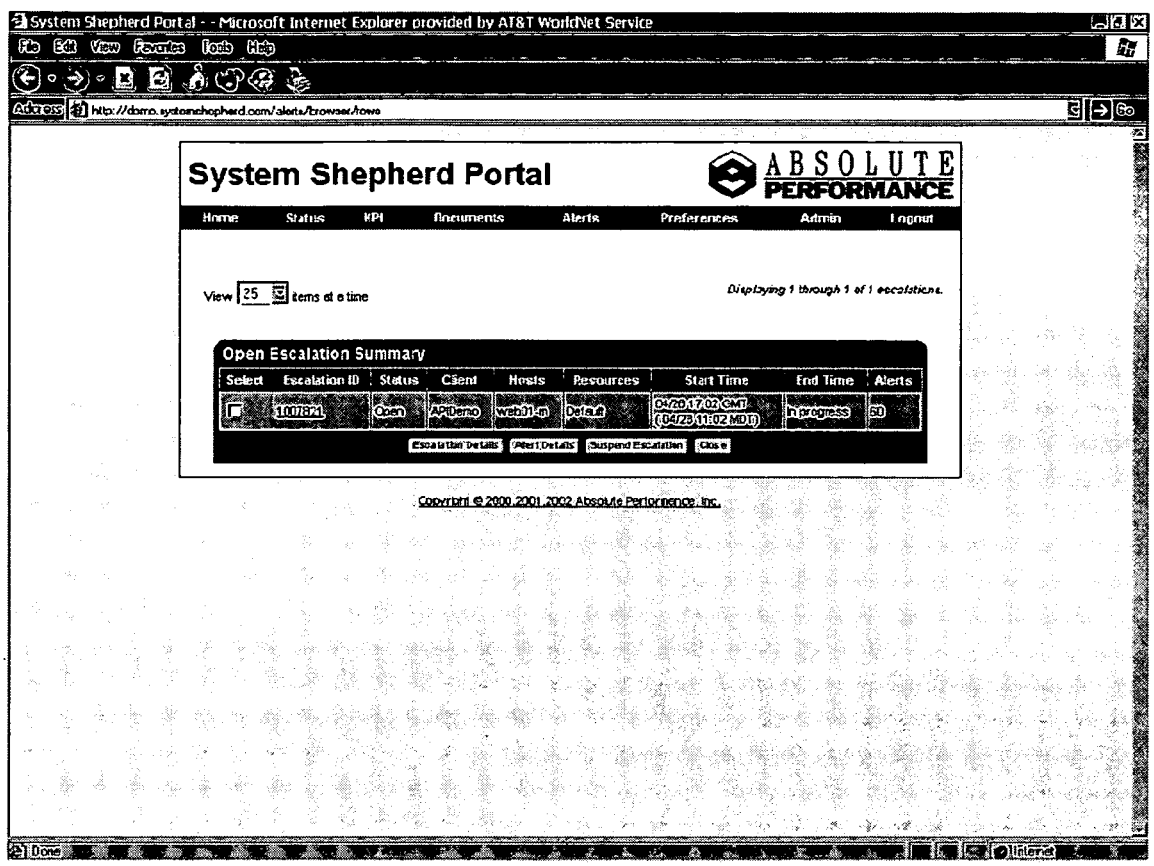
FIG. 14 is an example of an escalation management interface having an escalation list view, in accordance with an embodiment of the present invention.

FIG. 14 is an example of an escalation management interface having an escalation list view, in accordance with an embodiment of the present invention.

Figure 15:
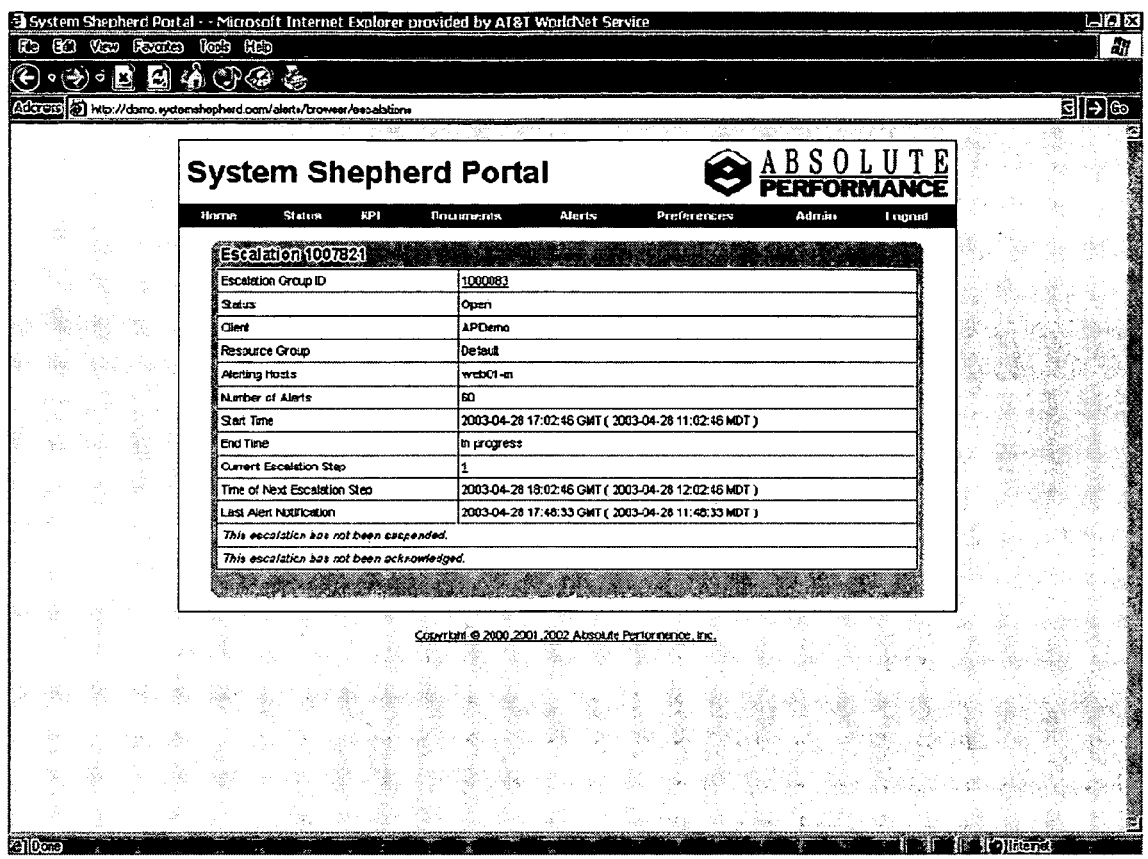
FIG. 15 is an example of an escalation management interface having an escalation detail view, in accordance with an embodiment of the present invention.

FIG. 15 is an example of an escalation management interface having an escalation detail view, in accordance with an embodiment of the present invention.

The management tools primarily consist of alert management interfaces available from the portal. The management console allows portal users to interact and manage most levels of the alert escalation server, including the ability view, acknowledge, suspend, or close escalations and their associated alerts, as well as the administrative components of creating and editing escalation paths and their lifecycle. In addition to these escalation and alert management tools, users also have the capability to suppress the alert system altogether by creating and maintaining host maintenance windows, which effectively tell the alert escalation system to ignore alerts generated by that host.

System and Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, collecting via a monitor agent performance and availability metrics, transmitting the metrics from the monitor agent to a data loader, transmitting alerts from the monitor agent to an escalation server, and analyzing the metrics and alerts using an analysis tool, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system for monitoring processes of an information technology (IT) system, the system comprising:
  a monitor agent configured to collect performance and availability metrics associated with at least one of a host machine, a network, an operating system, a database, and an application;
  a data loader, wherein the monitor agent is further configured to transmit the metrics to the data loader;
  an escalation server configured to receive and manage alerts generated by the monitor agent, and further configured to group an alert entering the escalation server into a resource group; and
  an analysis tool including an analysis tool application configured to assist a system manager in visualizing and understanding the performance of the information technology system through the use of at least one of a visual graph, a performance report, a real-time operating status, and a system health report.

2. The system of claim 1, wherein the metrics are transmitted to the data loader by way of one of HTTP, HTTPS, and SMTP.

3. The system of claim 2, wherein the metrics are transmitted to the data loader as a serialized XML stream, and wherein the data loader is further configured to deserialize the XML stream.

4. The system of claim 3, wherein the data loader is further configured to store each metric received from the monitor agent and to relate each metric with previously collected metrics associated with one of a same host machine, a same network, a same operating system, a same database, and a same application.

5. The system of claim 4, further comprising an in-memory caching system configured to lookup metric-host groupings while minimizing database traffic.

6. The system of claim 1, wherein the resource group is one of data related alerts, application related alerts, and operating system alerts.

7. The system of claim 1, wherein the analysis tool includes at least one of:
a data aggregation processing application;
a custom graphing engine;
a reporting engine; and
a web portal.

8. The system of claim 1, wherein the analysis tool application includes at least one of:
a data aggregation processing application;
a custom graphing engine;
a reporting engine; and
a web portal.

9. The system of claim 1, wherein the analysis tool is configured to convert raw measurement data into aggregate data for various time intervals, wherein aggregated data includes aspects of the raw measurement data for a given duration, the aspects including at least one of a minimum, a maximum, a mean, a median, a standard deviation, a skew, a kurtosis, and a percentile.

10. The system of claim 1, wherein the analysis tool is driven by a rollup daemon, the rollup daemon being a scaleable, distributable sub-system that processes incoming raw data and summarizes the incoming raw data according to time intervals specified by a given metric's assigned generic data category.

11. A method of monitoring processes of an information technology (IT) system, the method comprising:
collecting via a monitor agent performance and availability metrics associated with at least one of a host machine, a network, an operating system, a database, and an application;
transmitting the metrics from the monitor agent to a data loader;
transmitting alerts from the monitor agent to an escalation server, wherein the escalation server is configured to group an alert entering the escalation server into a resource group; and
analyzing the metrics and alerts using an analysis tool that includes an analysis tool application configured to assist a system manager in visualizing and understanding the performance of the information technology system through the use of at least one of a visual graph, a performance report, a real-time operating status, and a system health report.

12. The method of claim 11, wherein the step of transmitting the metrics comprises serializing the metrics into an XML stream.

13. The method of claim 12, further comprising:
storing each transmitted metric; and
relating each transmitted metric with previously collected metrics associated with one of a same host machine, a same network, a same operating system, a same database, and a same application.

14. The method of claim 11, wherein the steps of the method are stored on a computer-readable medium as one or more instructions, wherein the one or more instructions, when executed by one or more processors, cause the one or more processors to perform the steps of the method.

15. A data loader of a processes monitoring system for an information technology (IT) system, wherein the data loader is configured to receive metrics on a host machine from a monitor agent, wherein the metrics are described in a data repository according to a hierarchical metric taxonomy that conceptually relates classes of metrics with one another wherein the data loader is further configured to store each metric received from the monitor agent and to relate each metric with previously collected metric sharing a same host machine.

16. The data loader of claim 15, wherein the data loader is further configured to receive XML serialized metrics on the host machine from the monitor agent, wherein the data loader is further configured to deserialize the XML serialized metrics.

17. The data loader of claim 15, wherein each metric is configured to be grouped into a branch of one of:
data related to the host operating system;
data related to the host machine;
data related to a host application; and
data related to a host database.

18. The data loader of claim 17, wherein each branch is configured to be refined and classified into one or more sections, wherein one or more metric paths to each section are associated with individual hosts for which corresponding data is collected, wherein collected data is configured to be cataloged to a particular metric path and individual host, wherein the collected data is configured to be retrievable for subsequent analysis.

19. The data loader of claim 15, wherein individual metric paths that describe data gathered for a particular host are tied to a generic data path, wherein the generic data path is not tied to any host and describes a general family of metric paths.

* * * * *